No. 749,140. PATENTED JAN. 5, 1904.
E. B. HACK.
FILTER PRESS.
APPLICATION FILED JAN. 19, 1903.
NO MODEL. 4 SHEETS—SHEET 3.
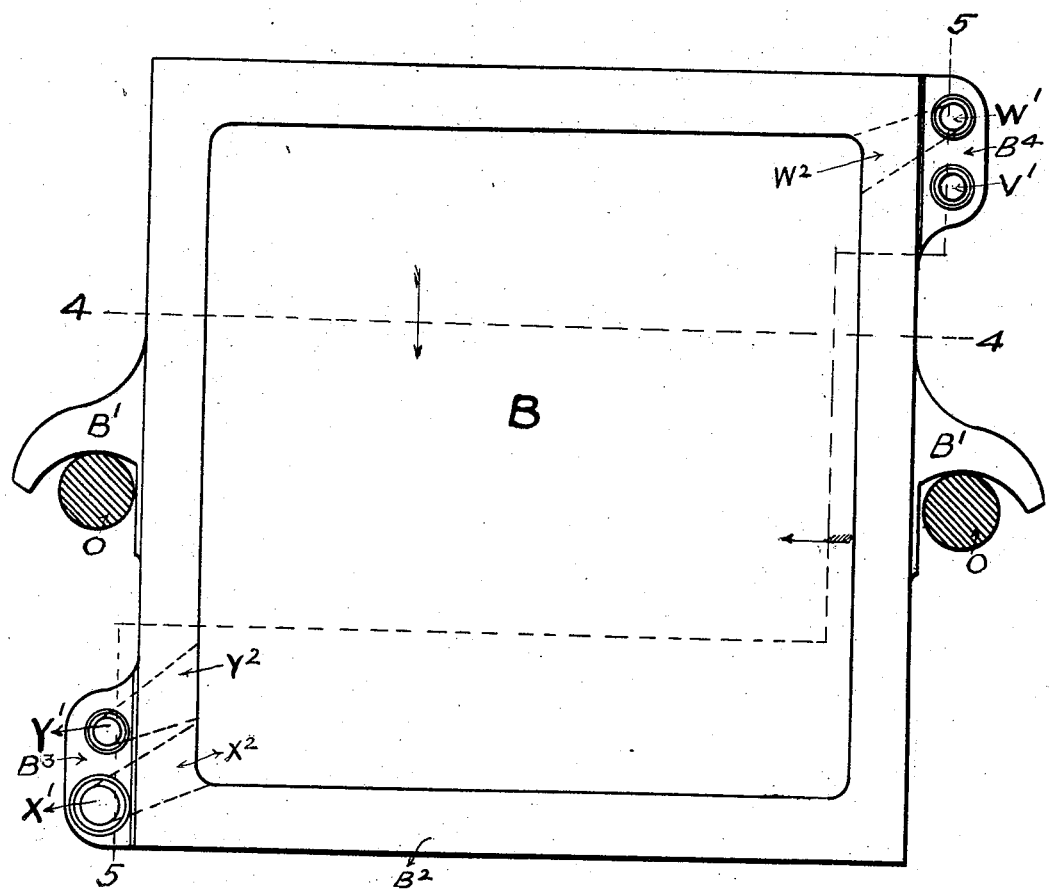
FIG 7
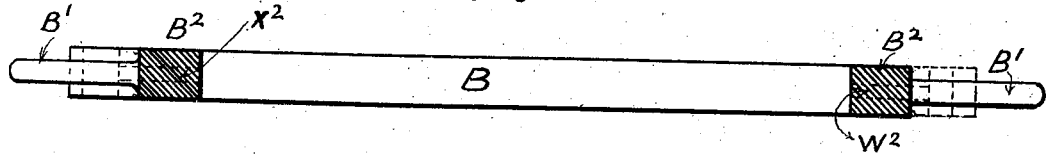
FIG 4
WITNESSES:
Dena Nelson.
Mary C. Lamb.
E. Barton Hack
INVENTOR.
BY 
ATTORNEY.

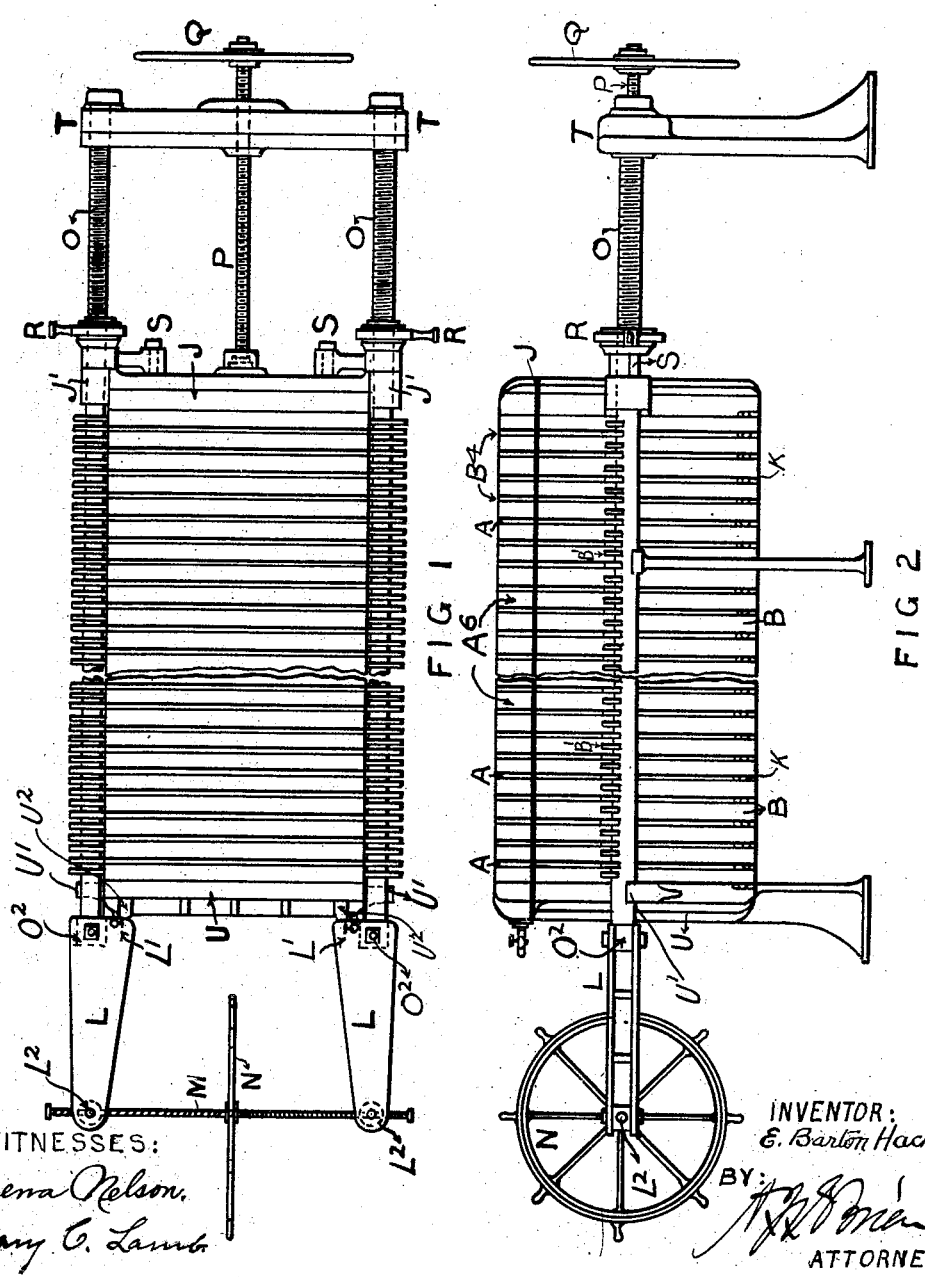

No. 749,140. PATENTED JAN. 5, 1904.
E. B. HACK.
FILTER PRESS.
APPLICATION FILED JAN. 19, 1903.
NO MODEL. 4 SHEETS—SHEET 4.

WITNESSES:
Dena Nelson.
Mary C. Lamb.

E. Barton Hack
INVENTOR.
BY
ATTORNEY.

No. 749,140. Patented January 5, 1904.

UNITED STATES PATENT OFFICE.

ERNEST BARTON HACK, OF DENVER, COLORADO, ASSIGNOR TO THE AMERICAN FILTER PRESS EXTRACTION COMPANY, OF DENVER, COLORADO, A CORPORATION OF COLORADO.

FILTER-PRESS.

SPECIFICATION forming part of Letters Patent No. 749,140, dated January 5, 1904.

Application filed January 19, 1903. Serial No. 139,714. (No model.)

*To all whom it may concern:*

Be it known that I, ERNEST BARTON HACK, a subject of the King of Great Britain, residing in the city and county of Denver and State of Colorado, have invented certain new and useful Improvements in Filter-Presses; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in filter-presses, my object being to facilitate the extraction of gold and other valuable metals from their ores or matrix by means of any suitable solution—as cyanid of potassium, sodium, barium, &c.—whereby the metals may be dissolved and drawn off from the gangue.

The invention will now be described in detail, reference being made to the accompanying drawings, in which is illustrated an embodiment thereof.

Figure 6:
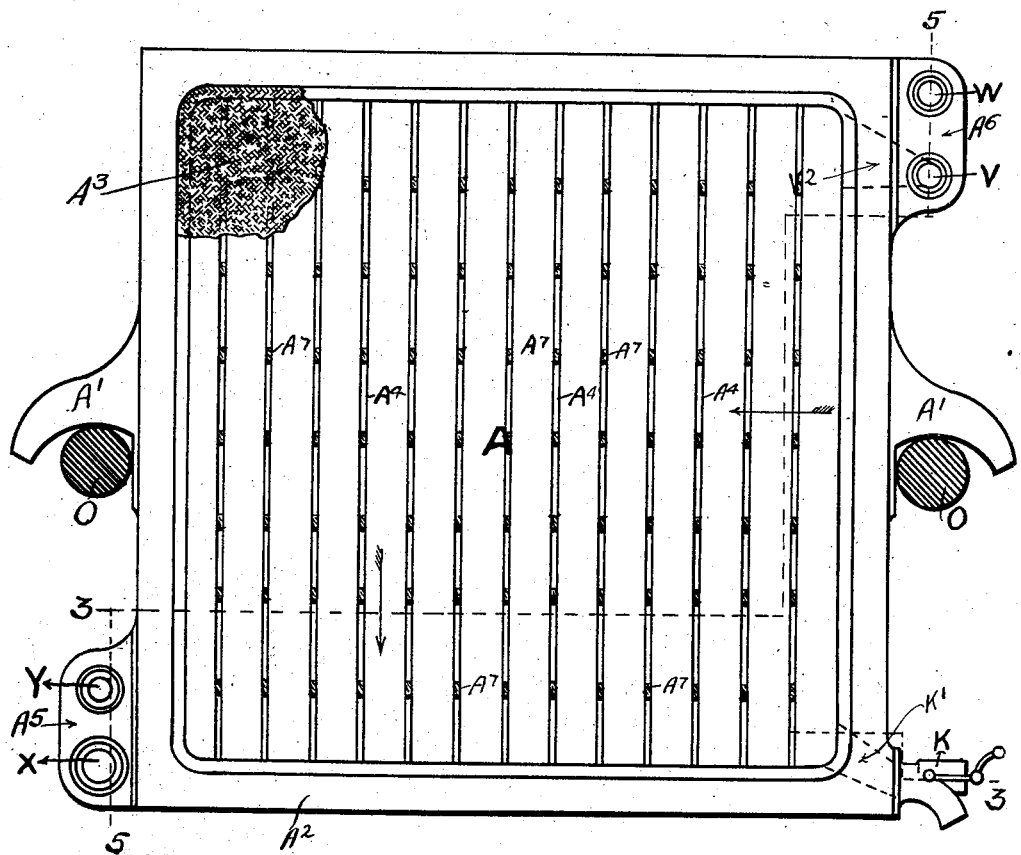
Figure 3:
Figure 5:
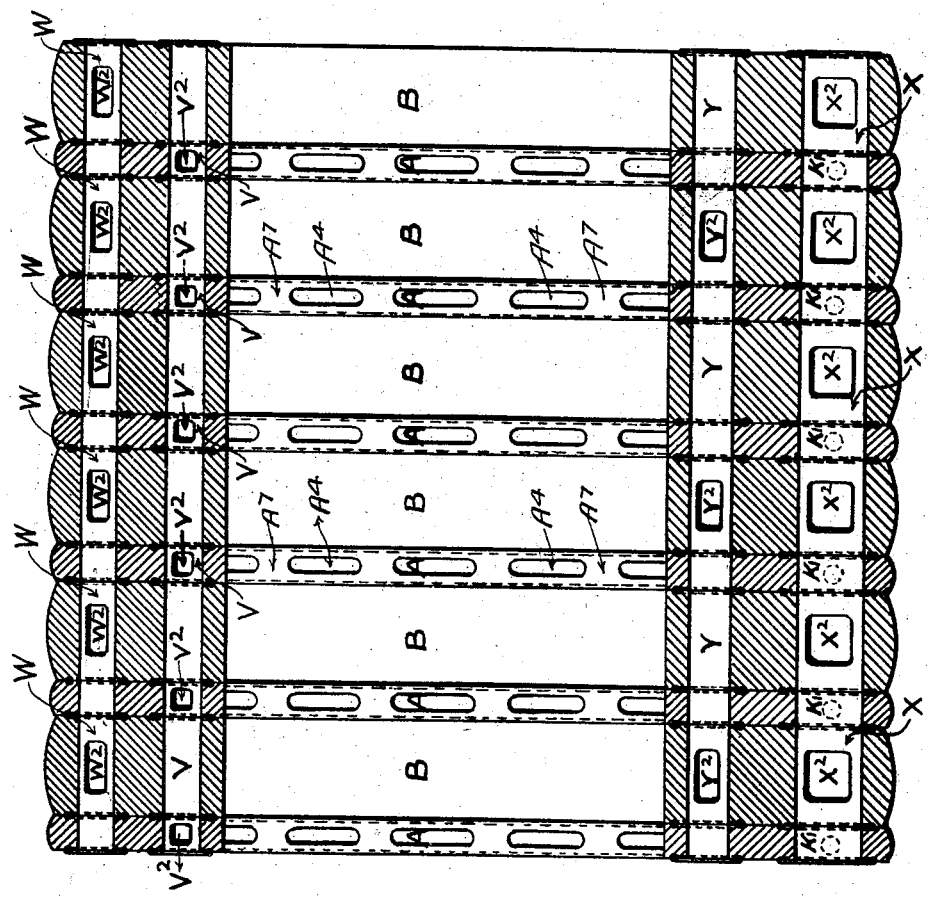

In the drawings, Figure 1 is a top or plan view of a filter-press equipped with my improvements. Fig. 2 is a side elevation of the same. Fig. 3 is a section taken on the line 3 3, Fig. 6. Fig. 4 is a section taken on the line 4 4, Fig. 7. Fig. 5 is a section taken on the line 5 5, Fig. 7. Fig. 6 is a detail view showing one of the filter-frames or filtering members, on an enlarged scale, the mesh material being broken away to disclose the intermediate construction which supports the mesh material or prevents it from collapsing in response to the pressure within the press. The supporting side bars for the filter-press are shown in cross-section in this view, and the figure may therefore be termed a "cross-section" of the press taken between a filter-frame and a pulp or cake frame, the intermediate perforated or slotted bars $A^7$ being also shown in section. Fig. 7 is a detail view of a pulp-cake frame shown on the same scale as the filter-frame in Fig. 6. This view is similar to Fig. 6, the horizontal supporting side bars being shown in section.

The same reference characters indicate the same parts in all the views.

Let A and B, respectively, designate the filter and pulp-cake frames, which constitute the main features of the filter-press. These frames A and B are alternately arranged, as best shown in Fig. 5, between two end heads or plates U and J, which are forced together, as hereinafter explained, to make tight joints between the frames A and B. The head U is a part of an integral casting forming the support for one end of the press, while the head J is movably mounted on two parallel longitudinal screw-shafts which are made fast at one extremity in a supporting-casting T T, remote from the casting U. Between the head J and the casting T T the shafts O O are threaded to receive adjusting-nuts R, which bear against saddle-pieces S S, pivotally mounted on the head J, whereby the said pieces may be raised and lowered at will. The saddle-pieces when resting on the shafts occupy a position between the nuts S and the bearings J' of the head J. This head has a free sliding movement on the shafts O, which pass through the bearings J'. The frames A and B are provided with hooks A' and B', respectively, located on opposite sides of the frames and engaging the shafts O, whereby the frames are supported in operative relation. The head U is provided with hook-shaped bearings U', open at the top to receive the shafts O, whereby the latter are supported at their extremities remote from the casting T. The shafts O project a short distance beyond the head U, as shown at $O^2$, and on these projections are fulcrumed two levers L, consisting of bifurcated plates whose short arms L' engage the head U on opposite sides. The long arms of the levers project beyond their fulcrums at right angles to the extension of the short arms L', and the extremities of these long arms are provided with nuts $L^2$, in which are threaded the opposite extremities of a union-screw M M or a screw provided with right-and-left threads. To the center of this screw is attached a hand-wheel N, the turning of which in the proper direction causes the outer extremities of the arms L to approach each other, whereby the short arms of the levers are forced against lugs $N^2$, formed integral with the head or end plate U, whereby said plate is acted on sufficiently to make perfectly tight joints between the filter-frames A and the pulp-cake frames B. The nuts R are employed to force the head J into position prior to final tightening of the frame by the levers. The head J is also acted on by a screw P, threaded in the frame T and provided with a hand-wheel Q. This screw P is also employed in the preliminary adjustment of the frames preparatory to the final tightening act through the instrumentality of the levers. The final tightening act of the levers is accompanied by only a very slight movement, consisting in the squeezing together to a slight degree of the various filter and pulp-cake frames in order to make the joints uniformly tight. It is absolutely necessary that these joints should be tight, owing to the fact that when the press is in use there is an interior pressure of considerable magnitude, which pressure would be sufficent to force the solutions out through the joints were they not made perfectly tight.

Each filter-frame consists of a flat bar $A^2$, surrounding a rectangular space of suitable area regulated or determined according to the desired size of the press. To the opposite sides of this frame part $A^2$ are applied two pieces of mesh material $A^3$, while between the two layers or diaphragms $A^3$ is located a number of bars $A^7$, provided with slots $A^4$. These bars form a backing to support the mesh material $A^3$ when pressure is applied to force the solutions through the filtering material of the frames.

The rail $A^2$ of each filter-frame is provided with exterior projections $A^5$ and $A^6$, located at opposite diagonal corners. The projection $A^5$ is provided with openings X and Y, having no direct communication with the interior of the frame or the space between the mesh-diaphragms $A^3$. The projection $A^6$ is provided with openings V and W, the opening V communicating with the interior of the frame by means of an efflux or eduction channel $V^2$, formed in the rail $A^2$ and indicated by dotted lines in Fig. 6, through which channel the solutions escape from the press after having been forced through the pulp in the cake-frames, the mesh material $A^3$, and the slotted bars $A^4$ of the filter-frames. At the lower corner of each filter-frame is located a faucet K, forming an alternative efflux or eduction channel which may be employed to draw off the solutions in lieu of the channels $A^7$ and openings V.

Each pulp-cake frame, which has been referred to generally and as a whole by the letter B, consists of a flat rail or bar $B^2$, which is engaged by the corresponding parts of the filter-frame to form closed joints when the members of the press are assembled. Each of these frames is provided at its upper and lower diagonal corners with exterior projections $B^3$ and $B^4$. The projection $B^3$ is provided with two openings X' and Y', which respectively communicate with the interior space surrounded by the rail $B^2$ by channels $X^2$ and $Y^2$. (Indicated by dotted lines in Fig. 7.) The exterior projection $B^4$ is provided with openings V' and W', the opening W' communicating with the interior of the frame or the space surrounded thereby by a channel $W^2$, formed in the rail. The opening X' is for the introduction of the ore-pulp to the pulp-frames. The opening Y' is for the introduction of the solvent solutions and liquids to the pulp-frame, while the opening W' is for the introduction of air to the pulp and solutions of the cake-frames.

When the filter and cake frames are assembled as heretofore described, the openings X and Y of the filter-frame register with the openings X' and Y' of the pulp-cake frames, and the openings V and W of the filter-frames respectively register or coincide with the openings V' and W' of the cake-frames. The pulp-frames B are thicker or deeper than the filter-frames, the relative thickness of the two sets of frames being best indicated in Fig. 5 of the drawings.

When the apparatus is in use, the pulp to be treated is introduced to the pulp-frames by forcing it into the long opening formed by the registering openings X and X' of the filter and cake frames, whereby all of the pulp-frames are filled with pulp, which is forced into the apparatus under air-pressure and enters the cake-frames B by way of channels $X^2$. After the frames B are filled with pulp air under pressure is introduced to the long opening formed by the various openings W and W' of all of the filter and pulp frames, whereby the air enters the pulp in the frames B and removes the superfluous moisture or fluid by forcing it out through the filter-frames by way of the channels $X^2$ and openings V, the air being first passed through the pulp-cake frames through the mesh material of the filtering members and the slotted bars placed between the mesh-diaphragms, as heretofore explained. The solvent solution is then introduced to the pulp of the cake-frames by way of openings Y' and channels $Y^2$. After the solutions have performed their function they pass under pressure into and through the filter-frames and out of the press by way of the channels $V^2$ and openings V' or by way of the faucets K, as may be desired, it being understood that the faucets K form an alternative escape or discharge passage leading from the filter-frame.

Attention is called to the fact that, as shown in the drawings, (see Fig. 5,) only every other pulp-frame is provided with a channel $Y^2$, leading from its opening Y', so that the solutions in order to reach the pulp of the other frames B must first pass through the filtering material carried by the frames A.

The body of the pulp in each pulp-frame B is formed into a cake; hence the term "cake-frames" applied to the frames B.

After the solutions have been passed through the filter-frame the pulp cakes are dried by compressed air introduced by way of openings $W'$ and $W^2$, the air acting to force the remaining solutions out of the cakes. Water is finally introduced under pressure to remove the remaining solutions, after which the pulp cakes are again dried by the introduction of air and the residue discharged. This final operation is accomplished by loosening the members of the press sufficiently to allow the pulp cakes to drop out of the pulp-frames.

In further explanation of the construction and operation of my filter-press attention is called to the fact that the channels $X^2$, $Y^2$, and $W^2$ of the pulp-cake frames are comparatively narrow, as indicated by dotted lines in Fig. 4, and are formed in the middle of the rail or equidistant between the planes of its outer surfaces, whereby the pulp and fluids are introduced in the central plane of the frames. By means of this construction the pulp cakes are thoroughly permeated by the solvent solutions and also by the air, which performs an important function in the metal-dissolving process. By reason of the central narrow channels $X^2$ the pulp is also introduced to better advantage and made to accumulate in parallel layers, engaging the filter-cloths of the filters on opposite sides of the pulp-frame. These layers of pulp are caused to cling to the mesh of the filters by reason of the pressure on the pulp, whereby the moisture is forced out through the filter during the formation of the pulp cake. The opposite layers of pulp as they are increased in thickness approach the central plane, which is last filled with pulp. The cake thus formed is least hard in its central plane, thus facilitating the entrance and the even distribution of the air and solutions. Hence the fluids work through the cake of pulp in both directions through a central plane and pass thence through the filters.

Attention is called to the fact that the hooks $B'$ $B'$ of the pulp-frames and $A'$ $A'$ of the filter-frames are centrally located, whereby the frames are supported by the shafts O midway of the vertical depth of the press, and are therefore easily moved on the shafts O. This arrangement of the hooks also facilitates the tilting of the pulp-frames after they are separated for the purpose of removing the cakes or residue after the leaching operation is completed.

Having thus described my invention, what I claim is—

1. A filter-press composed of pulp-holding and filtering members suitably arranged and connected and provided with registering openings forming longitudinal passages outside of the pulp and filter chambers, each pulp-frame having a lateral channel leading from said passage for the introduction of pulp to the various pulp-chambers, and a distinct lateral passage for the introduction of fluid, a portion of the pulp-frames having two lateral channels for the introduction of fluid, one for liquid and the other for air; the filtering members having efflux or discharge channels for the escape of the solutions after they have passed through the pulp of the pulp-holding frames.

2. The combination of a filter-press composed of distinct pulp-holding and filtering members suitably arranged and having a movable head or end, and tightening-levers arranged to act on one of the head members, substantially as described.

In testimony whereof I affix my signature in presence of two witnesses.

ERNEST BARTON HACK.

Witnesses:
 DENA NELSON,
 A. J. O'BRIEN.